United States Patent
Hahn et al.

[15] 3,642,378
[45] Feb. 15, 1972

[54] BORING BAR

[72] Inventors: Robert S. Hahn, Northboro; Arthur F. St. Andre, Shrewsbury, both of Mass.

[73] Assignee: The Heald Machine Company, Worcester, Mass.

[22] Filed: Nov. 3, 1969

[21] Appl. No.: 873,380

[52] U.S. Cl. ........................................................408/143
[51] Int. Cl. ..........................................................B23b 29/03
[58] Field of Search ..................................90/11 A; 408/143

[56] References Cited

UNITED STATES PATENTS 3,230,833   1/1966   Shurtliff..............................90/11 A
1,700,477   1/1929   Goode..................................77/58 B
3,374,710   3/1968   Sattler.................................77/58 B
3,499,350   3/1970   Hahn....................................77/58 B

*Primary Examiner*—Gerald A. Dost
*Attorney*—Norman S. Blodgett

[57] ABSTRACT

This invention relates to a boring bar and, more particularly, to apparatus for the generation of an internal surface of revolution, which apparatus contains a weight located at the end of a rod extending through a recess extending the length of the apparatus and filled with a viscous fluid.

5 Claims, 3 Drawing Figures

PATENTED FEB 15 1972 3,642,378

INVENTORS
ROBERT S. HAHN
ARTHUR ST. ANDRE
BY
*Morris S. Blodgett*
ATTORNEY

BORING BAR

BACKGROUND OF THE INVENTION

Because boring bars are mounted in the boring heads of a machine tool as cantilevers, they are subject to various kinds of vibration which tend to give a poor quality to the machined surface. Many attempts have been made to remove these vibrations by use of damping apparatus. One of the best known is an inertia damper known as the "Lanchester" damper, which is described in the paper of Robert S. Hahn, ASME Paper No. 50–F–11 entitled "Design of Lanchester Damper For Elimination Of Metal-Cutting Chatter." In this type of damper, the end of the boring bar is provided with a recess in which is inserted a ground slug or inertia weight closely fitted to its recess. The recess is then filled with a viscous liquid and the purpose of the weight is to offer an inertia force through the action of squeeze film damping which will oppose the forces of self-excited vibrations brought about by the sudden impulses of cutting.

Another method of damping which has been used is the "Frahm" absorber, which is similar to the one described above but which has a weight supported in a viscoelastic material, rather than in a viscous fluid. This mass is coupled to the main mass of the bar in a different manner, however, in that the coupling is by means of a spring as well as a dashpot, this spring being the physical properties of the viscoelastic material. This type of system subdues vibrations when its auxiliary mass and spring portion are properly tuned. However, these devices result in a boring bar in which the dynamic stiffness is less than a desirable amount. These and other difficulties experienced with the prior art devices have been obviated in a novel manner by the present invention.

It is, therefore, an outstanding object of the invention to provide a boring bar whose dynamic stiffness is very high.

Another object of this invention is the provision of a boring bar in which induced vibrations are quickly damped.

A further object of the present invention is the provision of a boring bar in which the bar acts in the manner of two cantilevered springs joined by a viscous coupling.

With these and other objects in view, as will be apparent to those skilled in the art, the invention resides in the combination of parts set forth in the specification and covered by the claims appended hereto.

SUMMARY OF THE INVENTION

In general, the present invention consists of a boring bar for use with a boring head, the bar having an elongated main body provided with means at one end for attachment to the boring head and with a cutting tool attached to the other end. A recess extends lengthwise through the main body and a weight is located in the recess adjacent the said other end of the main body. A rod lies in the recess and is attached at one end to the said one end of the main body and at the other end to the weight. A viscous fluid lies in the recess surrounding the weight and the rod.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
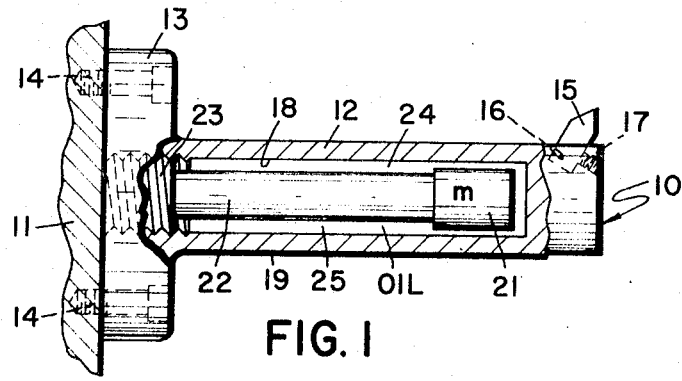
FIG. 1 is a side view with portions broken away of a boring bar embodying the principles of the present invention.

Referring first to FIG. 1, which best shows the general features of the invention, the boring bar, indicated generally by the reference numeral 10, is shown in use with a boring head 11. The bar consists of an elongated main body 12 having means such as a radial flange 13 integrally formed at one end for attachment by means of bolts 14 to the boring head 11. A cutting tool 15 is carried at the other end of the main body 12 and held in an angular recess 16 by a setscrew 17. A cylindrical recess 18 enters the said one end of the main body 12 and extends to a point adjacent the other end. The main body 12 has an outer cylindrical surface 19 which is concentric with the surface of the recess 18. A mass or weight 21, which is also cylindrical, is carried in the recess 18 adjacent the end which carries the cutting tool 15. A rod 22 of elongated cylindrical form is attached at one end to the weight 21 and at the other end to the main body 12 in the vicinity of the flange 13. More specifically, the entrance into the recess 18 at the flanged end is provided with threads and the rod is provided with an enlarged end 23 which is also provided with threads adapted to engage the threads on the recess to form a fluidtight joint.

The elements, therefore, define a space 24 which is filled with a body 25 of viscous fluid, such as oil. The space 24 is an entirely closed space defined by the surface of the recess 18 and the surfaces of the weight 21 and the rod 22. The cylindrical surfaces of the main body 12, the recess 18, the weight 21, and the rod 22 are all concentric with one another.

Figure 2:
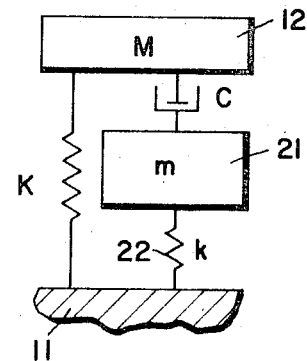
FIG. 2 is a diagrammatic view of the boring bar system for purposes of mathematical analysis.

For the purpose of analysis, FIG. 2 shows that the system operates as though the mass M of the main body 12 is supported on the fixed boring head 11 by two means. One is the spring provided by the main body 12 itself and which is shown as having the spring constant K. The other is the mass $m$ of the weight 21 which is connected to the boring head 11 by the rod 22 which is shown as having a spring constant $k$. The weight 21 is also connected to the mass M of the main body 12 by a viscous damper indicated as having a compliance $c$.

The operation and advantages of the present invention will be readily understood in view of the above description. The boring bar is used in the usual way; that is to say, it is introduced into a rotating workpiece whose surface of revolution to be formed has already been rough machined. The contact of the cutting tool 15 with the metal to be removed introduces a shock force into the boring bar system which, if it were not damped, would result in vibration of the boring bar producing variation in cutting of the work and poor quality in the finished surface. Vibrations of this type are induced in the boring bar in any number of ways; one of them is that the rough machined surface of revolution is not entirely concentric with the desired finished surface of revolution. This is called "runout" and results in the application of an alternating varying force to the bar which, if the bar has a natural frequency close to that introduced pulse, will produce large vibrations.

Figure 3:
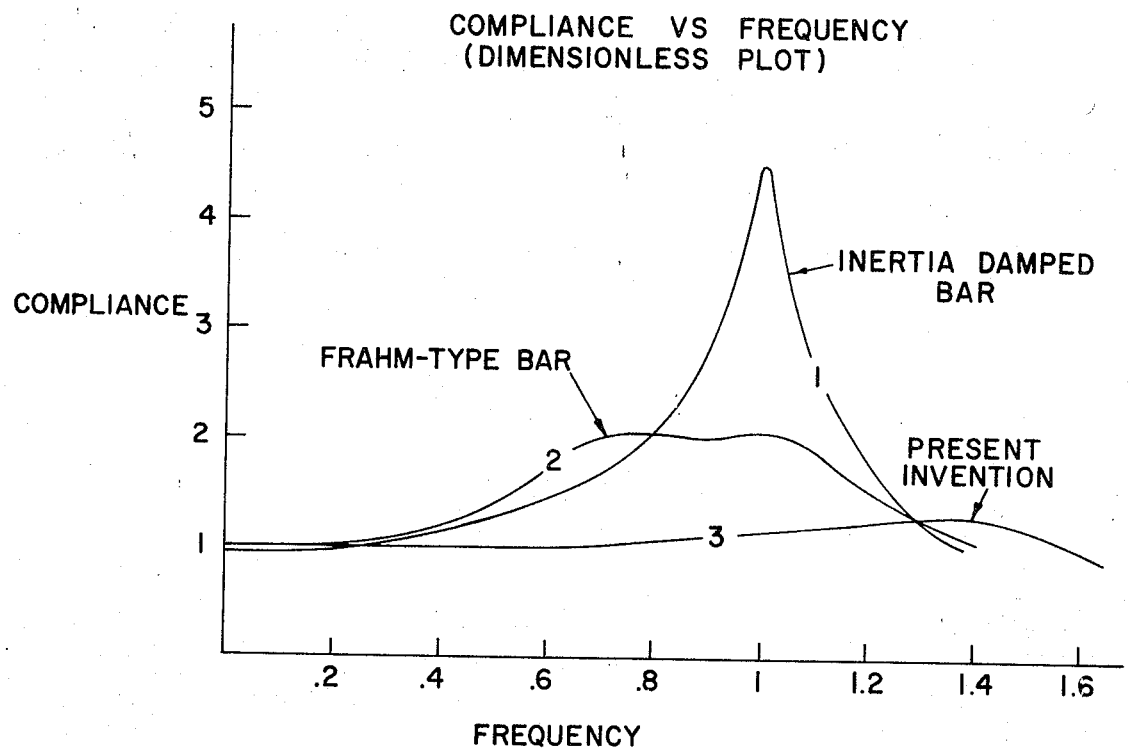
FIG. 3 is a graph showing comparative operation of the boring bar of the present invention as compared with those of the prior art.

FIG. 3 shows a plot or graph of the compliance versus the frequency for the inertia damped bar (Lanchester), the Frahm-type bar, and for the bar of the present invention. The inertia-damped bar (curve 1) has a peak at a certain frequency and, since compliance is the inverse of dynamic stiffness, this bar would be quite useless for general purpose machining. The Frahm-type bar (curve 2) has a rather high spot at certain frequencies. The curve of the present invention is a fairly flat plot and at all frequencies has less compliance than the other bars.

In conclusion, then, the new boring bar consists of an auxiliary mass coupled to the main mass by means of viscous squeeze film damping. The auxiliary mass is supported on a cantilever which is anchored to the flange. This cantilever acts as the damper spring. Experimental work done on this new type of system shows improvement in dynamic stiffness over the previous systems. Dynamic stiffness, being one of the main aspects when considering boring bar capabilities, should be as high as possible. The plotting of the dynamic compliance for the three types of bars described shows that the new bar is the stiffest of the three. Even without an increase in dynamic stiffness, the present boring bar would be quite useful because of its ability to be used in a centrifugal field. This means that a bar of this type can be used on crossfeed units without losing its damping properties. This is the type of operation where the previously used boring bars were deficient. The inertia weight of the first type of bar (Lanchester), when subjected to a centrifugal field, would be thrown against the outside of the hole and use all of its damping properties. This is also true of the second type (Frahm). The present weight, however, is not subject to this disability because it is restrained from such sideways movement by its supporting rod.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A boring bar for use with a boring head, comprising
  a. an elongated main body having means at one end for attachment to the boring head,
  b. a cutting tool attached to the other end,
  c. a recess extending lengthwise through the main body,
  d. a weight located in the recess adjacent the said other end of the main body,
  e. a rod lying in the recess and attached at one end only to the said one end of the main body and at the other end to the weight, the recess having a surface which is located a substantial distance from the weight and the rod, and
  f. a viscous material lying in the recess and surrounding the weight and the rod.

2. A boring bar as recited in claim 1, wherein the main body has a cylindrical surface for most of its length and the recess is a bore concentric with the cylindrical surface.

3. A boring bar as recited in claim 2, wherein the rod and the weight are cylindrical and are concentric with the cylindrical surface of the main body.

4. A boring bar as recited in claim 1, wherein the recess at the said one end of the main body and the rod at the same end are threadedly joined to totally close a space for the viscous material, the space being defined by the recess, the weight, and the rod.

5. A boring bar as recited in claim 4, wherein the said one end of the main body is provided with a radial flange for attachment to the boring head.

* * * * *